(12) United States Patent
Simonds

(10) Patent No.: US 8,631,143 B2
(45) Date of Patent: Jan. 14, 2014

(54) APPARATUS AND METHOD FOR PROVIDING MULTIMEDIA CONTENT

(75) Inventor: Grant Simonds, Altona (AU)

(73) Assignee: Mcomms Design Pty. Ltd., Altona, Victoria (AU)

( * ) Notice: Subject to any disclaimer, the term of this patent is extended or adjusted under 35 U.S.C. 154(b) by 539 days.

(21) Appl. No.: 12/143,054

(22) Filed: Jun. 20, 2008

(65) Prior Publication Data

US 2008/0320158 A1     Dec. 25, 2008

(30) Foreign Application Priority Data

Jun. 20, 2007    (AU) ................................ 2007903319

(51) Int. Cl.
*G06F 15/16*     (2006.01)
(52) U.S. Cl.
USPC ............ 709/231; 709/225; 709/226; 709/232
(58) Field of Classification Search
None
See application file for complete search history.

(56) References Cited

U.S. PATENT DOCUMENTS

| | | | | |
|---|---|---|---|---|
| 4,054,908 A * | 10/1977 | Poirier et al. | ............. | 348/14.09 |
| 4,272,787 A * | 6/1981 | Michael et al. | ............. | 348/559 |
| 4,965,819 A * | 10/1990 | Kannes | ............. | 348/14.07 |
| 5,365,265 A * | 11/1994 | Shibata et al. | ............. | 348/14.1 |
| 5,684,527 A * | 11/1997 | Terui et al. | ............. | 348/14.09 |
| 5,777,997 A * | 7/1998 | Kahn et al. | ............. | 370/493 |
| 5,875,304 A * | 2/1999 | Winter et al. | ............. | 709/231 |
| 5,875,305 A * | 2/1999 | Winter et al. | ............. | 709/231 |
| 5,986,703 A * | 11/1999 | O'Mahony | ............. | 348/333.12 |
| 6,037,970 A * | 3/2000 | Kondo | ............. | 348/14.1 |
| 6,115,079 A * | 9/2000 | McRae | ............. | 348/731 |
| 6,122,259 A * | 9/2000 | Ishida | ............. | 370/260 |
| 6,195,680 B1 * | 2/2001 | Goldszmidt et al. | ............. | 709/203 |
| 6,201,859 B1 * | 3/2001 | Memhard et al. | ............. | 379/93.21 |
| 6,240,105 B1 * | 5/2001 | Zetts | ............. | 370/503 |
| 6,317,165 B1 * | 11/2001 | Balram et al. | ............. | 348/699 |
| 6,369,846 B1 * | 4/2002 | Katsumi | ............. | 348/14.01 |
| 6,400,400 B1 * | 6/2002 | Isnardi et al. | ............. | 348/180 |
| 6,469,744 B1 * | 10/2002 | Pearlstein | ............. | 348/554 |
| 6,593,956 B1 * | 7/2003 | Potts et al. | ............. | 348/14.09 |
| 6,641,484 B2 * | 11/2003 | Oles et al. | ............. | 463/47 |
| 6,748,237 B1 * | 6/2004 | Bates et al. | ............. | 455/553.1 |
| 6,775,247 B1 * | 8/2004 | Shaffer et al. | ............. | 370/260 |
| 6,804,510 B1 * | 10/2004 | Bates et al. | ............. | 455/414.4 |
| 6,963,352 B2 * | 11/2005 | Whynot et al. | ............. | 348/14.08 |
| 7,123,745 B1 * | 10/2006 | Lee | ............. | 382/103 |
| 7,860,720 B2 * | 12/2010 | Thumpudi et al. | ............. | 704/500 |
| 2002/0015092 A1 * | 2/2002 | Feder et al. | ............. | 348/14.13 |
| 2002/0065922 A1 * | 5/2002 | Shastri | ............. | 709/227 |
| 2002/0101505 A1 * | 8/2002 | Gutta et al. | ............. | 348/14.07 |
| 2002/0196373 A1 * | 12/2002 | Szybiak et al. | ............. | 348/700 |
| 2003/0025599 A1 * | 2/2003 | Monroe | ............. | 340/531 |
| 2003/0055995 A1 * | 3/2003 | Ala-Honkola | ............. | 709/231 |
| 2003/0142670 A1 * | 7/2003 | Gould et al. | ............. | 370/390 |
| 2003/0220971 A1 * | 11/2003 | Kressin | ............. | 709/204 |
| 2004/0010464 A1 * | 1/2004 | Boaz | ............. | 705/40 |
| 2004/0031054 A1 * | 2/2004 | Dankworth et al. | ............. | 725/86 |
| 2004/0088741 A1 * | 5/2004 | Tsai et al. | ............. | 725/135 |

(Continued)

*Primary Examiner* — Ian N Moore
*Assistant Examiner* — Dung B Huynh
(74) *Attorney, Agent, or Firm* — Kenyon & Kenyon LLP

(57) ABSTRACT

A method of selectively providing multimedia content to a content receiving device comprises determining whether a first content stream provided to the content receiving device meets a predetermined criterion. Responsive to determining that the first content stream does not meet the predetermined criterion, at least one other content stream which meets the predetermined criterion is selected for provision to the content receiving device.

19 Claims, 4 Drawing Sheets

(56) References Cited

U.S. PATENT DOCUMENTS

| | | | |
|---|---|---|---|
| 2004/0141731 A1* | 7/2004 | Ishioka et al. | 386/111 |
| 2004/0194143 A1* | 9/2004 | Hirose | 725/97 |
| 2004/0205821 A1* | 10/2004 | Yamada et al. | 725/80 |
| 2004/0218100 A1* | 11/2004 | Staker et al. | 348/592 |
| 2005/0057551 A1* | 3/2005 | Gong et al. | 345/211 |
| 2005/0094030 A1* | 5/2005 | Brelay | 348/441 |
| 2005/0114901 A1* | 5/2005 | Yui et al. | 725/100 |
| 2005/0238320 A1* | 10/2005 | Shultz | 386/46 |
| 2005/0243167 A1* | 11/2005 | Clarke et al. | 348/14.12 |
| 2005/0250704 A1* | 11/2005 | Bassarab et al. | 514/18 |
| 2005/0251843 A1* | 11/2005 | Walker | 725/117 |
| 2005/0278763 A1* | 12/2005 | Huai | 725/100 |
| 2005/0283536 A1* | 12/2005 | Swanson et al. | 709/232 |
| 2006/0007305 A1* | 1/2006 | Shah | 348/97 |
| 2006/0103732 A1* | 5/2006 | Bateman | 348/208.2 |
| 2006/0125959 A1* | 6/2006 | Yoshizawa et al. | 348/569 |
| 2006/0132443 A1* | 6/2006 | Chien Wu | 345/166 |
| 2006/0132596 A1* | 6/2006 | Ahonen | 348/14.09 |
| 2006/0165242 A1* | 7/2006 | Miki et al. | 381/59 |
| 2006/0171453 A1* | 8/2006 | Rohlfing et al. | 375/240.01 |
| 2006/0214950 A1* | 9/2006 | Hsieh | 345/634 |
| 2006/0248210 A1* | 11/2006 | Kenoyer | 709/231 |
| 2007/0024706 A1* | 2/2007 | Brannon et al. | 348/142 |
| 2007/0046819 A1* | 3/2007 | Sasakura et al. | 348/571 |
| 2007/0120971 A1* | 5/2007 | Kennedy | 348/14.16 |
| 2007/0159530 A1* | 7/2007 | Park | 348/143 |
| 2007/0183661 A1* | 8/2007 | El-Maleh et al. | 382/173 |
| 2007/0237185 A1* | 10/2007 | Pereira et al. | 370/503 |
| 2007/0291667 A1* | 12/2007 | Huber et al. | 370/260 |
| 2008/0098446 A1* | 4/2008 | Seckin et al. | 725/114 |
| 2008/0127272 A1* | 5/2008 | Cragun et al. | 725/46 |
| 2008/0225119 A1* | 9/2008 | Murata | 348/153 |
| 2010/0118147 A1* | 5/2010 | Dorneich et al. | 348/155 |

* cited by examiner

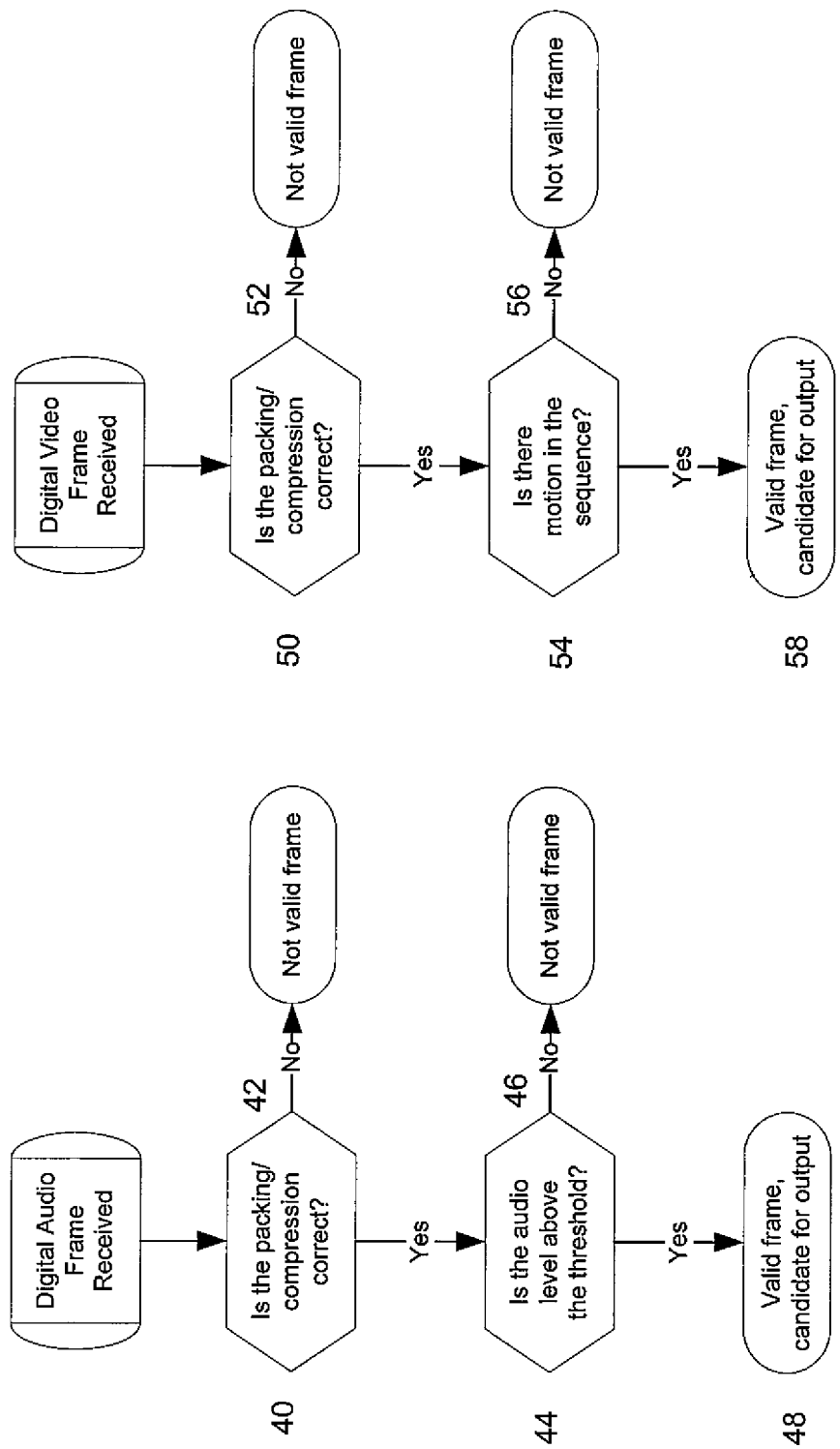

APPARATUS AND METHOD FOR PROVIDING MULTIMEDIA CONTENT

FIELD OF THE INVENTION

The present invention relates generally to systems and methods for providing multimedia content and particularly, but by no means exclusively, to selectively streaming multimedia content to mobile devices operating in a broadband network.

BACKGROUND OF THE INVENTION

Advances in audio and video (multimedia) compression technology over the last 20 years have made the transmission of high quality audio and video streams viable over low bandwidth networks. At the same time, the world's fixed and mobile communications networks have been upgraded to provide greater bandwidth. These networks are commonly referred to as broadband networks. Combining advanced multimedia compression with broadband networks allow providers to deliver high resolution audio and video to a wide variety of devices (personal computers, mobile phones etc).

With the recent availability of broadband networks, demand for multimedia content by subscribers has been rapidly increasing. More and more multimedia service providers are now offering multimedia content that can be streamed to a mobile device. The content may include both real-time content, such as a live sporting event, and non real-time content, such as a pre-recorded television program. Quite often, where the content is not available locally, service providers source the content from remote content providers, via a network such as the Internet. However, streaming content from a single service provider can be unsatisfactory due to the Internet's inherent unreliability (low availability). Any outage results in user dissatisfaction, which can potentially cost the service provider large sums of money, as well as negative publicity.

SUMMARY OF THE INVENTION

In accordance with a first aspect, the present invention provides a method of selectively providing multimedia content to a content receiving device over a communications network, the method comprising the steps of: determining whether a first content stream provided to the content receiving device meets a predetermined criterion; and responsive to determining that the first content stream does not meet the predetermined criterion, selecting at least one other content stream which meets the predetermined criterion for provision to the receiving device.

In the context of the specification, the term "content stream" is to be understood as any multimedia stream arranged to be continuously delivered to the receiving device and includes within its scope both real-time and non real-time data.

Embodiments of the present invention may advantageously provide seamless provision of multimedia content to content receiving devices by detecting whether a content stream being currently provided to the content receiving device is invalid (i.e. does not meet the predetermined criterion) and responsive to detecting that the stream is invalid, provide an alternative content stream (or combination of streams) to the content receiving device. In this manner, end users do not experience unwanted gaps in broadcast content due to unavailability of a particular stream.

In embodiments, the actual multimedia content of the at least one other content stream may be identical to that of the first content stream. In an alternative embodiment, the content may be different. In an embodiment, the content receiving device may comprise a streaming server arranged to stream the selected content to user devices via a communications network. Alternatively, the content receiving device may comprise the user device. The user device may be a mobile phone, personal computer or any other device arranged to receive and play the multimedia content stream(s).

In an embodiment, the step of determining whether a content stream meets the predetermined criterion comprises determining whether the audio volume level of the stream is above a threshold. In an embodiment, the step further comprises determining whether the audio level is above a threshold for a predetermined period of time.

In an alternative embodiment, the predetermined criterion is that a level of motion present in a sequence of frames of the content stream is above a predetermined threshold. The level of motion present in a sequence of frames may be determined by various methods including calculating the mathematical difference between the pixel luminance level in successive frames. The difference in luminance level between two successive frames may then be averaged to calculate a scalar motion level to establish the level of motion present in the sequence.

In an embodiment, the method comprises the further step of decompressing the content stream prior to determining whether it meets the predetermined criterion. In another embodiment, the method comprises the further step of decoding the content stream prior to determining whether it meets the predetermined criterion. The method may also comprise the further step of storing the decompressed and/or decoded stream in a buffer. In this manner, embodiments of the present invention may provide a high availability content output to a content receiving device from multiple lower availability inputs by detecting which input content streams meet the predetermined criteria and automatically switching the output to the best working content stream stored in the buffer. Availability is typically measured as the quotient of "Mean Time Between Failures" (MTBF) and the sum of MTBF and "Mean Time To Repair" (MTTR).

In an embodiment, a user of the content receiving device may allocate which of the at least one other content streams is to be provided in the event of the first content stream not meeting the predetermined criterion. In an embodiment, the predetermined criteria may not be based on the validity of a stream but instead be a user command requesting that at least one other content stream be selected for provision to the user device, so as to enable the appearance of "changing channels" or "zapping", similar to the operation of a television.

In an embodiment, the step of selecting at least one other content stream may comprise adjusting a frame rate of a frame sequence of the at least one other stream to correspond with the frame rate of the first stream. Advantageously, by synchronising the frame rates of the content streams, buffer overruns and underruns may be avoided. Further, where the streams being provided to the content receiving device are compressed, synchronising the frame rate of the streams allows switching of streams to take place without needing to restart the compression scheme which may result in a gap of content being experienced by the content receiving device. This has the effect of ensuring a seamless transition of content streams being provided to the content receiving device.

The step of adjusting the frame rate may comprise providing only selected frames of the at least one other content stream to the user device. For example, this may involve skipping successive frames to reduce the frame rate of the at least one other content stream. Alternatively, the step of adjusting the frame rate may comprise repeating selected frames of the at least one other content stream for provision to the user device. Alternatively, where the content stream is an audio content stream, the step of adjusting the frame rate may comprise stretching or shrinking the time period of selected frames to correspond with the frame rate of the content stream previously provided to the content receiving device. This may be achieved, for example, by converting audio samples from the time domain to the frequency domain (a well known method for this is the Fourier Transform), then converting the samples back to time domain using a different time base. This has the affect of stretching or shrinking the length of the audio without affecting the pitch.

In an embodiment, once a stream or streams are selected for provision to the content receiving device, the stream(s) may be encoded into a format which is different to the format in which they were previously encoded. That is, the content streams for provision to the content receiving device may be "transcoded". For example, the content source may initially be encoded in MPEG2 format and output (i.e. provided) in a different encoded and compressed format. For example, the selected stream may be encoded in H.263 format while the audio could be compressed in Adaptive Multi-Rate (AMR) format and both could be streamed using Real Time Protocol (RTP) over an IP network.

In accordance with a second aspect, the present invention provides an apparatus for selectively providing multimedia content to a content receiving device, the apparatus comprising: a determination module arranged to determine whether a first content stream provided to the receiving device meets a predetermined criterion; and a selection module arranged to select at least one other content stream that meets the predetermined criterion for provision to the receiving device, responsive to the determination unit determining that the first content stream does not meet the predetermined criterion.

In an embodiment, the apparatus further comprises a transmitter module arranged to provide the at least one other content stream to the receiving device over a communications network. The communications network may be a wireless network. The receiving device may be a streaming server or satellite transceiver arranged to broadcast the at least content stream to one or more user terminals. In an embodiment, the receiving device is a user terminal. For example the user device may comprise a video camera and microphone, or a digital multimedia file from a storage medium. In an embodiment, the content streams are generated remotely from the apparatus. The content streams may be provided over a broadband communications network. Many types of communications medium may be used including but not limited to direct cable connection, Internet Protocol (IP) network, circuit switched network, analogue signal, storage medium. In an embodiment, the communications network is an IP network. The content streams received by the apparatus may be encoded and/or compressed. In an embodiment, the content streams are generated by one or more local devices.

In accordance with a third aspect, the present invention provides a method of providing an indication that a multimedia content stream is valid, the method comprising the steps of: determining whether the content stream meets a predetermined criterion; and providing an indication of whether the content stream is valid based on the determination.

In an embodiment, the step of determining whether the content stream meets the predetermined criterion comprises the further step of determining whether an audio level of the stream is above a threshold.

In an embodiment, the step of determining whether the content stream meets the predetermined criterion comprises determining whether a predetermined level of motion is detected in a frame sequence of the content stream. In an embodiment, the method comprises the further step of decoding the content stream prior to determining whether it meets the predetermined criterion. The method may also comprise the further step of decompressing the content stream prior to determining whether it meets the predetermined criterion. In an embodiment, the indication comprises at least one of a visual and auditory indication.

In accordance with a fourth aspect, the present invention provides a computer program for selectively providing multimedia content to a content receiving device, the program comprising at least one instruction which, when implemented on a computer readable medium of a computing system, causes the computing system to implement the method steps according to the first aspect.

In accordance with a fifth aspect, the present invention provides a computer readable medium providing a computer program in accordance with the fourth aspect.

In accordance with a sixth aspect, the present invention provides a computer program for selectively providing multimedia content to a content receiving device, the program comprising at least one instruction which, when implemented on a computer readable medium of a computing system, causes the computing system to implement the method steps according to the third aspect.

In accordance with a seventh aspect, the present invention provides a computer readable medium providing a computer program in accordance with the sixth aspect.

BRIEF DESCRIPTION OF THE DRAWINGS

Features and advantages of the present invention will become apparent from the following description of embodiments thereof, by way of example only, with reference to the accompanying drawings, in which:

FIGS. 4 & 5 are schematics illustrating the process steps for determining whether a content stream meets predetermined criteria.

DETAILED DESCRIPTION OF PREFERRED EMBODIMENTS

In the description which follows an embodiment of the present invention is described in the context of a method and apparatus for selectively providing multimedia content to a content receiving device in the form of a streaming server. The streaming server is subsequently arranged to stream the selected content to user devices in the form of mobile stations operating in a broadband mobile network which is capable of handling both multimedia content services in addition to conventional circuit switched voice services. However, it should be understood that the present invention is not limited to the example application described herein and is equally applicable to other varieties of communications systems or network configurations. Moreover, the network components described herein may be arranged in different hierarchical, access and inter-connection formats capable of streaming multimedia content to user devices.

Figure 1:
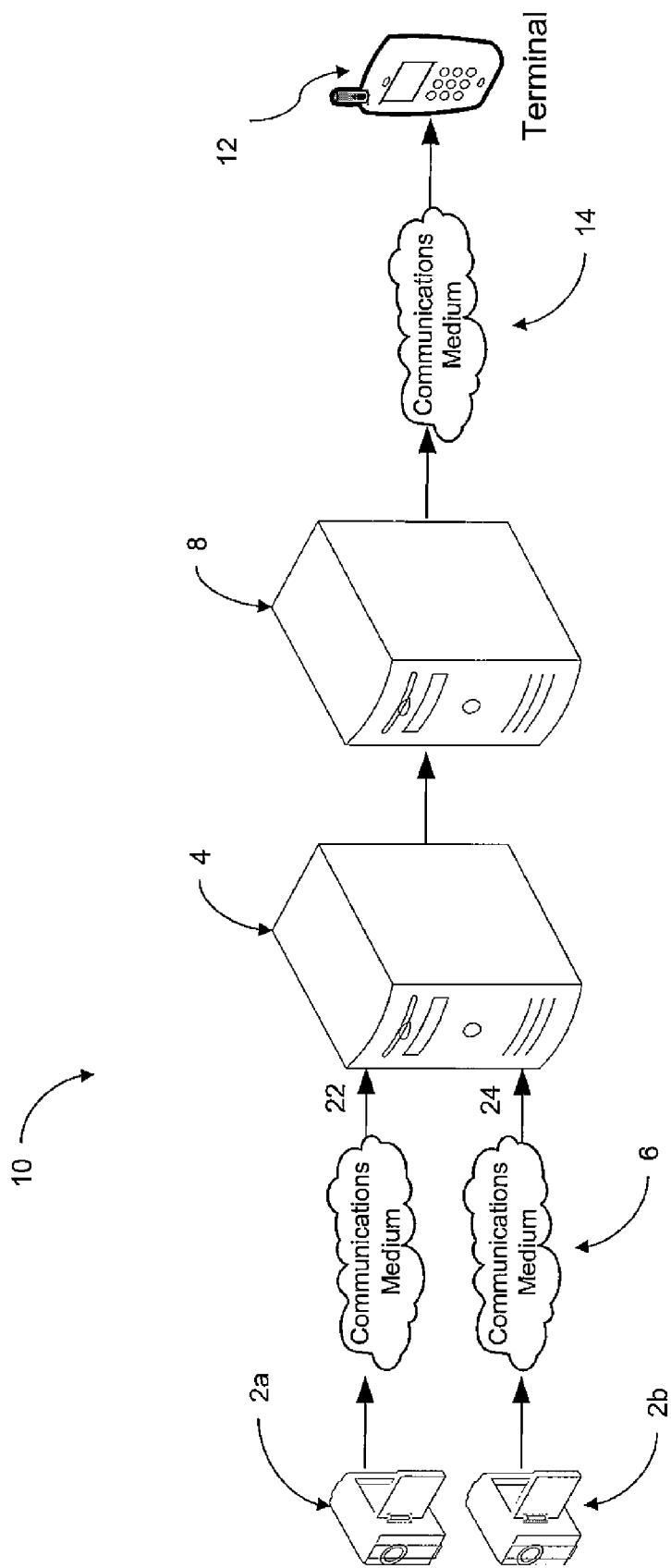
FIG. 1 is a schematic diagram of a system for providing multimedia content to a content receiving device, in accordance with an embodiment of the present invention.
Figure 2:
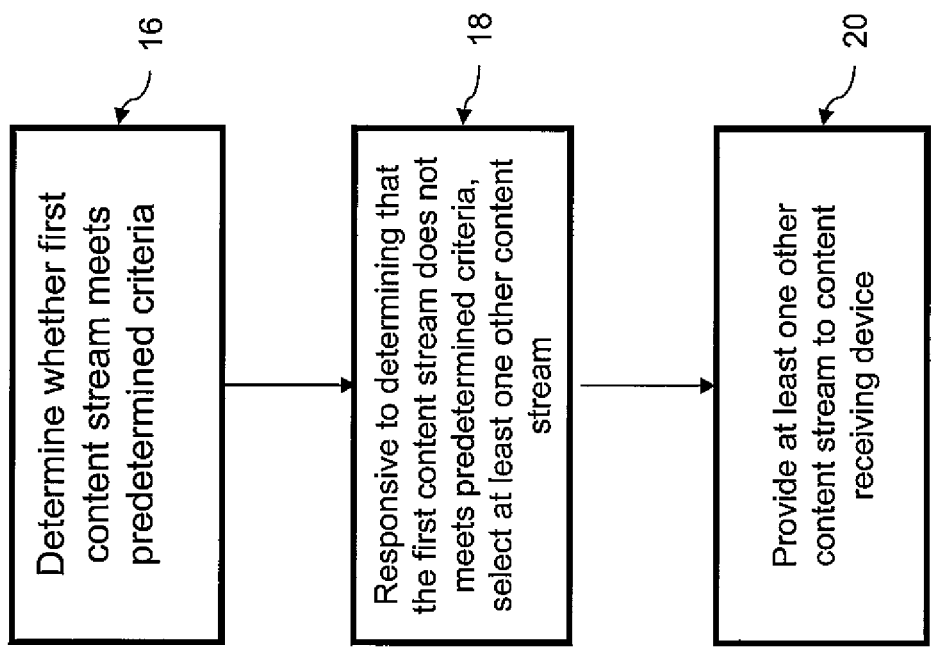
FIG. 2 is a flow chart showing method steps for selectively providing content using the system of FIG. 1, in accordance with an embodiment of the present invention.

Referring to FIGS. 1 & 2, multimedia content streams are initially generated by video cameras 2a, 2b which are connected to an apparatus 4 in the form of a computing system (which may take the form of a switching server), via a communications network 6. In this embodiment, the communications network 6 is in the form of an Internet Protocol network (or IP network) and the content streams are packetised using a standard Internet Protocol. As will be described in more detail in subsequent paragraphs, the switching server 4 is arranged to inspect the incoming multimedia content streams to determine whether they are valid (i.e. meet a predetermined criterion) and, using the methodology of the described embodiment, determine which stream (or combination of streams) to provide to a streaming server 8 for subsequent streaming to the mobile terminal 12. In the embodiment described herein, the streaming server 8 streams the selected content to the mobile terminal 12 over a wireless broadband network 14.

To determine which streams to provide to the streaming server 8, the switching server 4 firstly inspects the stream which is currently being provided to the streaming server 8 to determine whether it meets a predetermined criterion (see step 16 of FIG. 2). The predetermined criterion may be, for example, determining whether a volume level of the content stream is above a minimum threshold. In another embodiment, the predetermined criteria may be that the level of motion between subsequent frames of the content stream is above a predefined level. If, at step 18, the switching server 4 establishes that the predetermined criterion has not been met, it selects another one of the incoming streams which does meet the predetermined criteria. At step 20, the switching server 4 outputs the newly selected stream to the streaming server 8.

Figure 3:
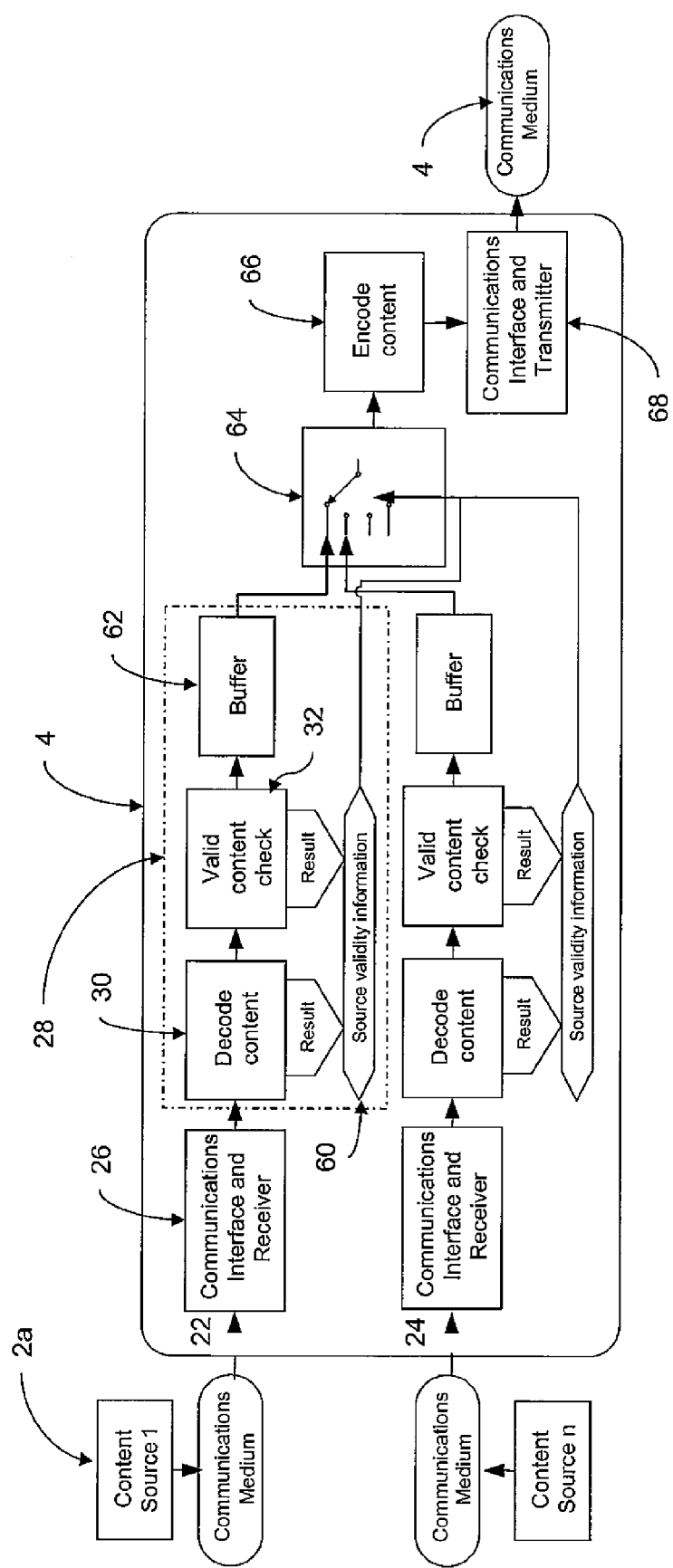
FIG. 3 is a block diagram of a multimedia switching server, in which embodiments of the present invention may be implemented.

A detailed description of the switching server 4 arranged to implement the aforementioned method, will now be described with reference to FIG. 3.

As discussed above, the apparatus is in the form of a switching server 4 which is arranged to receive multimedia content streams at two or more inputs (in this case two inputs 22, 24), via the IP network 6. In the embodiment described herein, the content streams are processed and buffered independently of one another by a combination of hardware and software modules provided by the switching server 4. For convenience, only the set of hardware and software modules for the content stream received from video camera 2a will be described in detail (i.e. the content stream received at input 22). It will be noted that, in this embodiment, the two sets of hardware and software modules comprise identical modules.

The switching server 4 includes a first module to process the received content stream, referred to herein as the communications interface and receiver module (CIR) 26. The CIR module 26 divides the received stream into sequences of samples/frames of a length which is set based on the requirements of the various validity checking parameters, which will be discussed later with reference to FIGS. 4 & 5. In the embodiment described herein, the content stream is divided into lengths of 20 seconds.

The frame sequence is subsequently provided to a determination module 28 which includes a decoding module 30 and valid content check module 32. The determination module 28 performs the function of checking whether the frame sequence (i.e. both audio and video) is valid based on a set of predetermined criterion. In the embodiment described herein, the predetermined criteria include: (1) a determination as to whether the audio level of the audio frame sequence is above a minimum threshold; and (2) a determination as to whether there is a sufficient level of motion present in the video frame sequence.

The process of determining whether the audio level of the audio frame sequence is above a minimum level is shown in FIG. 4. At step 40 the decoding module 30 decodes the audio frame sequence and determines whether the packing and compression of the audio frame sequence is valid. The type of decoding performed by the decoding module 30 is dependent on how the content has been packaged by the content source. In the embodiment described herein, the content streams have been packaged and compressed using a Motion Pictures Experts Group (MPEG) standard for audio-visual content, namely MPEG-4. The process of determining whether the packing and compression of the audio frame sequence is valid involves using a checksum algorithm to detect bit errors in the content stream. If it is determined by the decoding module 30 that the packing and compression of the audio frame sequence is valid, the decoding module 30 passes the audio frame sequence to the valid content check module 32. Otherwise, the audio frame sequence is deemed invalid and not suitable for provision to the streaming server 8 (step 42). At step 44, the valid content check module 32 inspects the audio frame sequence to determine if the audio level (which may be determined by measuring the digitised voltage levels) is above a predefined threshold. If it is determined that the audio frame sequence is above the threshold, then the audio stream is considered to be valid and, dependent on the video frame sequence determination, suitable for provision to the streaming server 8 (step 48). Otherwise, the audio frame sequence is considered invalid and not suitable for provision to the streaming server 8 (step 46).

The process of determining whether the video frame sequence is valid is shown in FIG. 5. At step 50, the decoding module 30 decodes the video frame sequence and, using the same technique as outlined above, determines whether the packing and compression of the video frame sequence is valid. If it is established that the packing and compression is invalid the content stream is deemed as not suitable for provision to the content receiving device 8 (step 52). Otherwise, the decoding unit 30 passes the video frame sequence to the valid content check module 32 to determine if there is sufficient motion in the sequence (step 54). In an embodiment, this may involve computing the mathematical difference between the pixel luminance levels in successive frames of the video frame sequence, then summing or averaging the difference to calculate a level of motion. If it is determined by the content check module 32 that the level of motion does not meet a predetermined level, the video frame sequence is considered invalid (step 56). Otherwise, the content check module 32 deems that the sequence is valid (step 58).

The result of the validation check (for both audio and video frame sequences) which is output by the valid content check module 32 is stored in a register 60. Uncompressed frame sequences that are found to be valid (as described above) are temporality stored in a buffer 62 and presented to a selection module 64 for possible output to the streaming server 8.

The selection module 64 utilises the validity information stored in the register 60 to decide, which buffered frame sequence to provide to the streaming server 8. In an embodiment, the output may comprise of a combination of buffered frame sequences. In an embodiment, the output may comprise of only a video frame sequence or audio frame sequence.

The selected frame sequence (or combination of frame sequences selected for provision to the streaming server 8)

may not be running at the same frame speed as the frame sequence previously provided to the streaming server 8. To avoid buffer underruns or overruns, the speed of the frames of the selected frame sequence exiting the buffer 62 may be matched to the speed of the previously provided frame sequence. This also prevents needing to restart the compression scheme to cater for the new stream. When the input and output are running at exactly the same speed, the communications interface and transmitter (CIT) 68 reads frames from the buffer 62 in the sequence that they were stored in. When the frame speed of the selected frame sequence is running faster than the previous frame sequence (i.e. the input is running faster than the output), the CIT 68 is arranged to skip selected frames in order to avoid buffer overrun. Conversely, when the input is running slower than the output, the CIT 68 is arranged to repeat selected frames in order to avoid buffer underrun. In this manner, the input(s) effectively becomes synchronised with the speed of the output. For example, if the frame rate of the new stream is slower then the previous stream, the CIT 68 may repeat every $n^{th}$ frame where n is dependent on the determined difference in speed. It will understood that this process could equally be carried out in the encoding module 66, or some other appropriate module of the server 4.

In the embodiment described herein, the selection module 64 selects a single input frame sequence (i.e. corresponding to the content stream provided by video camera 2a) to use as the audio-visual content stream provided to the streaming server 8. The selection is based on a preferred input which is always shown at the output whilst ever valid audio and video frames are being received from this input. If the preferred input stops receiving valid audio and/or video, then the switching server 4 may automatically switch to using the secondary input (i.e. the content stream received at input 24) as the output. If the primary and secondary inputs fail, then a tertiary input can be used and so on, up to the total number of inputs provided to the switching server 4. As all input content streams may be synchronised (as described above), switching between inputs is a seamless process which ensures that no frames are dropped during the switching process. Furthermore, in the case of a compressed output, the server 4 does not need to restart the compression scheme to cater for the newly selected stream. Using this automatic switching mechanism, it is possible to increase the availability of the system when the content sources are unreliable. Also, the switching mechanism may be utilised to switch content streams to give the affect of a "channel changing" or "zapping" appearance in response to a user command. In other words, the predetermined criterion may be a user request rather than an unreliable content stream.

The selected frame sequence is subsequently provided to an encoding module 66, where the frame sequence is encoded and optionally compressed in a desired format. There are many different types of encoding and compression that could be implemented by the encoding module 66 including, but not limited to, MPEG, Windows Media Standard, H.263 Standard, Adaptive Multi-Rate (AMR) coding, among others. It is noted that the frame sequence need not be encoded or compressed where the output stream is to be provided directly to an end unit, such as for direct display on a video screen or for transmission across an uncompressed communications medium (e.g. where the switching server is coupled directly to the content receiving device by a wired link).

After the optionally encoded and compressed frame sequence (i.e. content stream) is output from the encoding module 66, the content stream is streamed over the communications medium 4 utilising the CIT module 68.

It will be understood that the switching server may include any suitable hardware and software for carrying out embodiments of the present invention. In an embodiment, the server 4 includes a motherboard, central processing units, random access memory, hard disks, networking hardware and a power supply. In addition to the hardware, the server 4 includes an operating system (such as Red Hat Linux, which can be obtained from www.redhat.com) that resides on the hard disk and which co-operates with the hardware to provide an environment in which software applications can be executed. In this regard, the hard disk of the server computing system 104 may be loaded with the aforementioned modules to carry out embodiments of the present invention. The server computer 4 also includes an I/O bus and bridge to connect to I/O devices, such as the video cameras and any other device arranged to provide content streams to the server computer 4. A modem and network adapter are also coupled to PCI bus 130 to allow the server 4 to exchange data with the streaming server 8 and remote content providing devices.

In preceding paragraphs, the apparatus for carrying out the selective provision of multimedia content was described in the context of a server computing system which is independent of both the content source (e.g. video cameras) and streaming server 8. However, in alternative embodiments, the apparatus may be incorporated into one or both of the content source and streaming server. For example, the apparatus may be wired to the content source (e.g. a plurality of video cameras) and arranged to distribute the content over an Internet network to user device. It will also be understood that the user devices may be any device arranged to receive and play multimedia content including, but not limited to, mobile phones, portable computing devices (such as PDAs and the like), digital audio players, digital video players, personal computers, set-top boxes, streaming servers, streaming clients, automatic teller machines, vending machines or any other device capable of receiving streamed multimedia content.

In the embodiment described above, the multimedia content streams comprised of real time audio-visual content. However, it will readily be understood by persons skilled in the art, that the content stream may consist of only video or only audio streams. It will also be understood that the multimedia content may comprise non real time content which is to be streamed to a user device. For example, the content to be streamed may comprise local multimedia files, modulated television signals, uncompressed digital audio/video, analogue audio/video or other sources of audio and/or video content.

A reference herein to a prior art document is not an admission that the document forms part of the common general knowledge in the art in Australia.

The invention claimed is:

1. A method of selectively providing multimedia content to a content receiving device, the method comprising the steps of:

receiving a plurality of source content streams with the same video content, each of the source content streams comprising an audio component and a video component, streaming output content comprising audio and video components to the content receiving device, the output content being derived from a first source content stream selected from the plurality of received source content streams;

sampling the first source content stream to extract a frame sequence having audio and video components, and evaluating the functionality of the first source content stream from the extracted frame sequence, switching to a new source content stream selected from the plurality of received source content streams when the frame sequence is indicative of a streaming error, wherein a streaming error is determined when a level of audio for the audio component or a level of motion for the video component of the frame sequence is less than a corresponding predefined minimum threshold value; and synchronizing the frame rate derived from the new source content stream with the frame rate being streamed to the content receiving device.

2. A method in accordance with claim 1, further comprising calculating the difference in pixel luminance between successive frames of the frame sequence to establish a motion indicator.

3. A method in accordance with claim 1, comprising the further step of decoding and/or decompressing the first source content stream prior to evaluating the functionality of the first source content stream.

4. A method in accordance with claim 3, comprising the further step of storing the decoded and/or decompressed stream in a buffer.

5. A method in accordance with claim 1, further comprising providing a subset of frames from the new source content stream to the content receiving device to synchronize the frame rate of the new source content stream with the frame rate being streamed to the content receiving device.

6. A method in accordance with claim 1, further comprising repeating selected frames of the new source content stream for provision to the content receiving device to synchronize the frame rate of the new source content stream with the frame rate being streamed to the content receiving device.

7. A method in accordance with claim 1, further comprising modifying the time period of audio components from the new source content stream to synchronize the frame rate of the new source content stream with the frame rate being streamed to the content receiving device.

8. An apparatus for selectively providing multimedia content to a content receiving device, the apparatus comprising:
a receiver arranged to receive a plurality of source content streams with the same video content, each of the source content streams comprising an audio component and a video component;
a transmitter arranged to stream output content to the content receiving device over a communications network, the output content being derived from a first source content stream selected from the plurality of received source content streams;
a processor arranged to sample the first source content stream and extract a frame sequence having audio and video components, the processor further arranged to evaluate the functionality of the first content stream from the extracted frame sequence;
a switch arranged to selectively switch to a new source content stream selected from the plurality of received source content streams when the frame sequence is indicative of a streaming error, wherein a streaming error is determined when a level of audio for the audio component or a level of motion for the video component of the frame sequence is less than a corresponding predefined minimum threshold value; and
a synchronizer arranged to synchronize the frame rate derived from the new source content stream with the frame rate being streamed to the content receiving device.

9. An apparatus in accordance with claim 8, wherein the communications network is a wireless network.

10. An apparatus in accordance with claim 8, wherein the apparatus is a streaming server.

11. An apparatus in accordance with claim 8, wherein the content receiving device is a mobile user terminal.

12. An apparatus in accordance with claim 8, wherein the content streams are received over a broadband communications network.

13. An apparatus in accordance with claim 8, further comprising an adjustment module operable to adjust a frame rate of the new content stream to correspond with the frame rate being streamed to the content receiving device.

14. A non-transitory computer readable medium arranged to provide a program for selectively providing multimedia content to a content receiving device, the program comprising at least one computer readable instruction which, when implemented by a computing system, causes the computing system to:
receive a plurality of source content streams with the same video content, each of the source content streams comprising an audio component and a video component,
stream output content comprising audio and video components to the content receiving device, the output content being derived from a first source content stream selected from the plurality of received source content streams;
sample the first source content stream to extract a frame sequence having audio and video components, and evaluate the functionality of the first source content stream from the extracted frame sequence,
switch to a new source content stream selected from the plurality of received source content streams when the frame sequence is indicative of a streaming error, wherein a streaming error is determined when a level of audio for the audio component or a level of motion for the video component of the frame sequence is less than a corresponding predefined minimum threshold value; and
synchronize the frame rate derived from the new source content stream with the frame rate being streamed to the content receiving device.

15. A media streaming method comprising:
receiving a plurality of source content streams with the same video content;
streaming output content to a receiving device over a communications network, the output content being derived from a first source content stream selected from the plurality of received source content streams, the first source content stream having an audio component and a video component;
evaluating the functionality of the first source content stream and switching to a new source content stream when the first source content stream is determined to have a streaming error, the new source content stream being selected from the plurality of received source content streams, wherein a streaming error is determined when a level of audio for the audio component or a level of motion for the video component is less than a corresponding predefined minimum threshold value, and
synchronizing an output stream derived from the new source content stream with the output being streamed to the receiving device so that both streams have the same frame rate.

16. The method of claim 15, further comprising checking the new source content stream for errors before switching the source content stream.

17. The method of claim 15, further comprising sampling the first source content stream to extract a plurality of frame sequences each having audio and video components; and switching the source content stream when a frame sequence is indicative of an error with the audio component or the video component of the first source content stream.

18. The method of claim 17, further comprising comparing pixel luminance of successive frames from each of the frame sequences to determine a motion indicator; and establishing a video error when the motion indicator is less than a motion threshold.

19. The method of claim 17, further comprising determining an audio level indicator for each of the frame sequences; and establishing an audio error when the audio level indicator is less than an audio threshold.

* * * * *